(12) United States Patent
Kandylas et al.

(10) Patent No.: US 10,127,115 B2
(45) Date of Patent: Nov. 13, 2018

(54) GENERATION AND MANAGEMENT OF SOCIAL GRAPH

(71) Applicant: Microsoft Technology Licensing, LLC, Redmond, WA (US)

(72) Inventors: Vasileios Kandylas, Sunnyvale, CA (US); Serge-Eric Tremblay, Pullman, WA (US); Omar Alonso, Redwood Shores, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 264 days.

(21) Appl. No.: 15/074,560

(22) Filed: Mar. 18, 2016

(65) Prior Publication Data

US 2017/0270006 A1    Sep. 21, 2017

(51) Int. Cl.
*G06F 17/30*  (2006.01)
*G06F 11/14*  (2006.01)
*G06Q 50/00*  (2012.01)

(52) U.S. Cl.
CPC .... *G06F 11/1446* (2013.01); *G06F 17/30088* (2013.01); *G06F 17/30327* (2013.01); *G06F 17/30551* (2013.01); *G06F 17/30861* (2013.01); *G06Q 50/01* (2013.01)

(58) Field of Classification Search
None
See application file for complete search history.

(56) References Cited

U.S. PATENT DOCUMENTS 8,312,056 B1    11/2012  Peng et al.
8,583,673 B2    11/2013  Tarek et al.
8,700,512 B1 *   4/2014  Kuznetsov .............. G06Q 40/00
                                                              705/35
(Continued)

FOREIGN PATENT DOCUMENTS

WO        2013113028 A1    8/2013

OTHER PUBLICATIONS

"Facebook", Retrieved From «https://en.wikipedia.org/w/index.php?title=Facebook&oldid=708798065», Mar. 7, 2016, 44 Pages.
"Materialized view", Retrieved from: «https://en.wikipedia.org/w/index.php?title=Materialized_view&oldid=707748001», Mar. 1, 2016, 3 Pages.

(Continued)

*Primary Examiner* — Richard L Bowen
(74) *Attorney, Agent, or Firm* — Merchant & Gould P.C.

(57) ABSTRACT

Non-limiting examples of the present disclosure describe utilization of a social graph, created from evaluation of extracted social media data, to generate temporal snapshots related to social media data. The temporal snapshots enable users to explore different levels of interest related to social media data. In one example, a social media identifier is identified. A social graph may be accessed to evaluate the social media identifier. An exemplary social graph includes clustered relationships developed based on analysis of social media data extracted from at least one social networking service. The social graph may be used to generate a temporal snapshot for the social media identifier. The temporal snapshot may be transmitted to an entry point for output of the temporal snapshot. Other examples are also described including navigation between content of temporal snapshots based on selection of linked data, among other examples.

14 Claims, 13 Drawing Sheets

(56) References Cited

U.S. PATENT DOCUMENTS

| | | | |
|---|---|---|---|
| 8,909,569 B2 | 12/2014 | Spivack et al. | |
| 9,183,598 B2 | 11/2015 | Dey et al. | |
| 2010/0205541 A1 | 8/2010 | Rapaport et al. | |
| 2011/0320423 A1* | 12/2011 | Gemmell | G06F 17/30867 707/706 |
| 2012/0303710 A1 | 11/2012 | Roberts et al. | |
| 2013/0117659 A1 | 5/2013 | Yamat et al. | |
| 2013/0218866 A1 | 8/2013 | Qian et al. | |
| 2013/0263019 A1* | 10/2013 | Castellanos | G06Q 50/01 715/753 |
| 2014/0136528 A1 | 5/2014 | Anima et al. | |
| 2015/0012811 A1* | 1/2015 | Chan | G06F 17/30873 715/234 |
| 2015/0039565 A1 | 2/2015 | Lucas | |
| 2015/0046436 A1* | 2/2015 | Li | G06F 17/3053 707/723 |
| 2015/0120680 A1 | 4/2015 | Alonso et al. | |
| 2015/0127653 A1 | 5/2015 | Keng et al. | |
| 2015/0186532 A1 | 7/2015 | Agarwal et al. | |
| 2015/0220615 A1 | 8/2015 | Wexler et al. | |
| 2016/0004667 A1 | 1/2016 | Chakerian et al. | |
| 2016/0188704 A1* | 6/2016 | Dassa | G06F 17/30867 707/750 |
| 2016/0188729 A1* | 6/2016 | Ardhanari | G06F 17/30867 707/727 |
| 2017/0180301 A1* | 6/2017 | Bastide | G06F 17/3097 |
| 2017/0270180 A1* | 9/2017 | State | G06F 17/30598 |

OTHER PUBLICATIONS

"Social graph", Retrieved From: «https://en.wikipedia.org/w/index.php?title=Social_graph&oldid=709312044», Mar. 10, 2016, 3 Pages.

"Social network analysis", Retrieved From:«https://en.wikipedia.org/w/index.php?title=Social_network_analysis&olid=710221822», Mar. 15, 2016, 9 Pages.

"Wikipedia: "Mobile Web"", Retrieved from«https://en.wikipedia.org/w/index.php?title=Mobile_Web&oldid=560066364», Feb. 8, 2016, 6 Pages.

Debasish Ghosh., "Functional and Reactive Domain Modeling—MEAP version 7", In Manning Publications, Jun. 27, 2015, 52 Pages.

Jeff, Smith "Reactive Machine Learning Systems—MEAP version 1", by Manning Publications, 30 Pages.

Malak, et al., "Spark GraphX in Action—MEAP version 2", In Manning Publications, Apr. 27, 2015, 47 Pages.

"PCT International Search Report and Written Opinion Issued in PCT Application No. PCT/US17/021701", dated Apr. 25, 2017, 16 Pages.

Dörk, et al., "PivotPaths: Strolling through Faceted Information Spaces", In Proceedings of IEEE Transactions on Visualization and Computer Graphics, vol. 8, Issue 12, Dec. 2012, 10 pages.

Puniyani, et al., "Social Links from Latent Topics in Microblogs", In Proceedings of the NAACL HLT Workshop on Computational Linguistics in a World of Social Media, Jun. 2010, pp. 19-20, 2 pages.

"Google", Retrieved on: Feb. 1, 2016, Available at: https://www.google.co.in/search?sugexp=chrome,mod=6&sourceid=chrome&ie=UTF-8&q=hilary+clinton&gws_rd=ssl#q=hillary+clinton, 1 page.

* cited by examiner

400

700

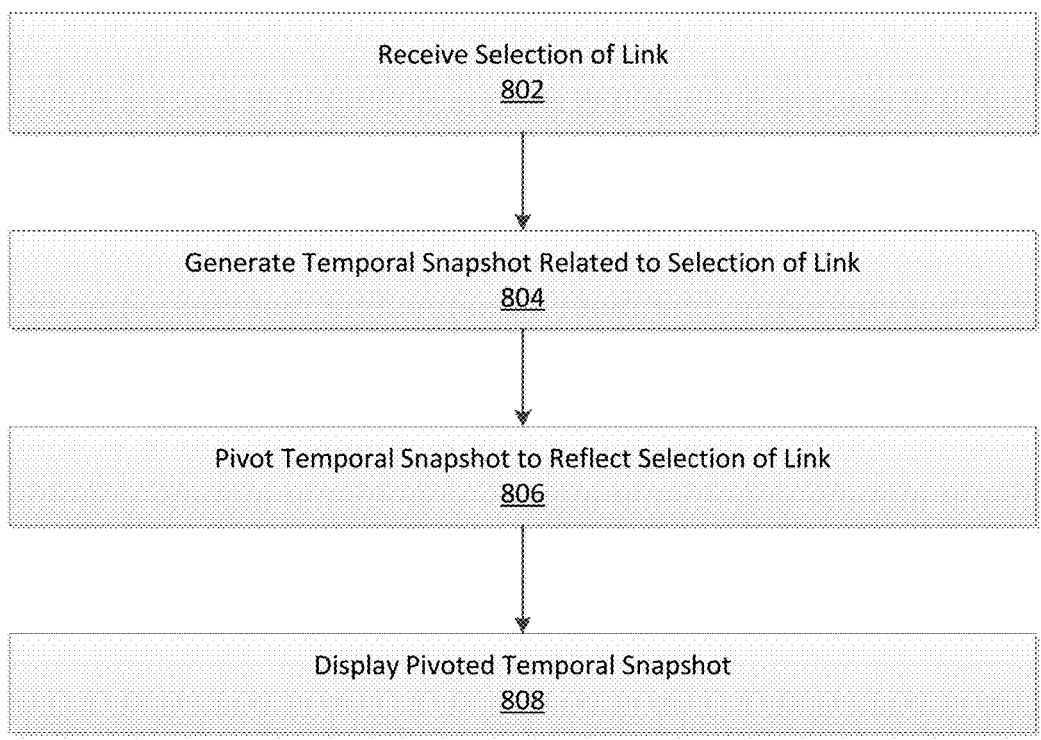

FIG. 9
900

GlobalWarming – Articles From Social Media    Related: #ClimateChange #GreenhouseGases
Contributors: Al Gore

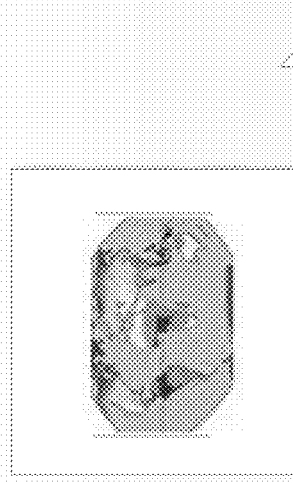

Climate Change:
Where it All Started;
Current warming of
the Earth's climate
system results in
some disturbing
trends
11/13/2015

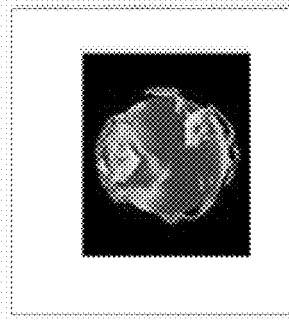

Century-Scale Rise:
The rate of warming
almost doubled for
the last half of the
period from 1906-
2005
11/15/2015

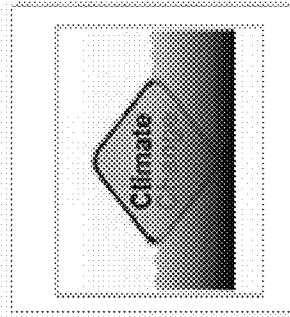

Greenhouse Gases:
The Greenhouse
effect is the process
by which absorption
and emission of
infrared radiation by
gases in a planet's
atmosphere warm
its lower atmosphere
and surface
11/17/2015

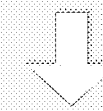

1100

1120

GENERATION AND MANAGEMENT OF SOCIAL GRAPH

BACKGROUND

Social media content tends to be isolated from other related content. A social networking service may enable a user to access specific content through an identifier (e.g. link, message group, hashtag). However, contextual analysis of the identifier is typically not performed. This may prevent a user from understanding larger or more specific context of the social media content. It is with respect to the general technical environment of improved processing for devices that transfer data between applications that the present application is directed.

SUMMARY

Non-limiting examples of the present disclosure describe utilization of a social graph, created from evaluation of extracted social media data, to generate temporal snapshots related to social media data. The temporal snapshots enable users to explore different levels of interest related to social media data. In one example, a social media identifier is identified. A social graph may be accessed to evaluate the social media identifier. In one example, the social media identifier may be at least one selected from a group consisting of: a hashtag extracted from at least one social networking service and a uniform resource identifier extracted from at least one social networking service. However, as described herein, a social media identifier is not limited to such examples. An exemplary social graph includes clustered relationships developed based on analysis of social media data extracted from at least one social networking service. The social graph may be used to generate a temporal snapshot for the social media identifier.

An exemplary temporal snapshot may comprise data extracted from the social graph including: the social media identifier, a related social media link corresponding with the social media identifier, a link to a related topic for the social media identifier, and a link to a contributor for context of the social media identifier. A temporal snapshot is not limited to the foregoing example and may include more than one social media identifier, related social media link, links to related topics, and links to contributors, among other types of data. In other examples, a temporal snapshot may comprise data such as a summary of a topic related to a context of the social media identifier. In another example, the temporal snapshot may comprise a timeline of events related to the social media identifier. In another example, location data corresponding to the context of the social media identifier may be included in the temporal snapshot. As can be understood from such examples, generation of a temporal snapshot may be customized to comprise any of a plurality of data described herein. Other forms of knowledge data (obtained from sources separate from an exemplary social graph) may also be incorporated into a temporal snapshot. One example of customization may comprise generating different temporal snapshots for different geographic regions, which may provide more targeted content for users at specific locations.

A generated temporal snapshot may be stored for use at any time after creation. For example, a query may request data for a specific stored temporal snapshot. The stored temporal snapshot may be re-called and transmitted to an entry point for display. In other examples, a temporal snapshot is generated instantaneously. The temporal snapshot may be transmitted to an entry point for output of the temporal snapshot. An exemplary entry point may be separate from a social networking service. An example entry point is a search engine service. However, as described herein, entry points are not limited to such an example. A temporal snapshot may be displayed through the entry point.

Other examples are also described including navigation between content of temporal snapshots based on selection of linked data, among other examples. An exemplary temporal snapshot may be displayed. As an example, the temporal snapshot may comprise: a social media identifier, a related social media link corresponding with the social media identifier, a link to a related topic for the social media identifier, and a link to a contributor for context of the social media identifier. A selection may be received for a link within the temporal snapshot. In response to receiving the selection, display of the temporal snapshot is pivoted to an updated temporal snapshot. The updated temporal snapshot may feature at least one of the related social media link, the link to the related topic, and the link to the contributor. The updated temporal snapshot may be displayed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 8 is an exemplary method for processing related to pivoting an exemplary temporal snapshot with which aspects of the present disclosure may be practiced.

FIG. 9 illustrates a processing device view of an exemplary temporal snapshot with which aspects of the present disclosure may be practiced.

DETAILED DESCRIPTION

Figure 1:
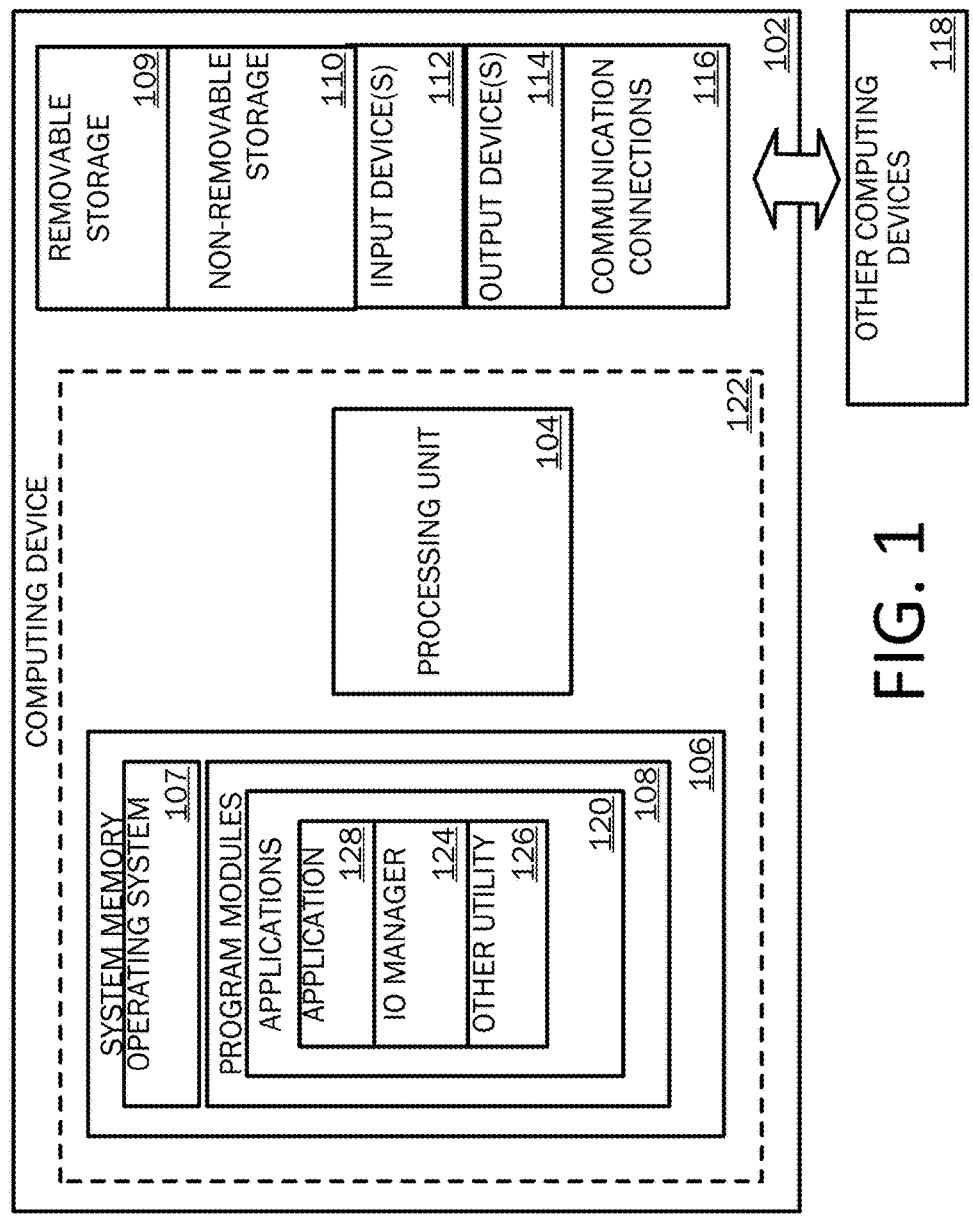
FIG. 1 is a block diagram illustrating an example of a computing device with which aspects of the present disclosure may be practiced.

Non-limiting examples of the present disclosure describe creation, utilization and management of a social graph. An exemplary social graph is a representation of interconnection between relationships in social media data extracted from one or more social network services and augmentation of data during processing of the social media data. Social media data is any type of linked data (e.g., link, label, delimiter, metadata tag, hashtag, cashtag, image, video, article, etc.) that expresses a specific content (or topic/theme of content). A social media identifier may be a specific social media data. As one example, a social media identifier may be a hashtag for climate change (e.g., #climatechange) that links to discussion and content related to a topic of global climate change. However, one skilled in the art should recognize that a social media identifier is not limited to such an example. Social media data may be extracted from a social networking service, where the social media data may be further evaluated and processed to generate a social graph. A social networking service is an application/service that is used to build social networks or social relations among users who share similar interests, activities, backgrounds or real-life connections, among other examples. Social networking services may be web-based services that are configured to enable users to interact with other users over the Internet. Social media data such as social media identifiers may be shared within social networking services. In some examples, social networking services are configured for sharing of social media data through different services such as e-mail, messaging, postings, and connections, among other examples.

Typically, social networking services may provide social media data but fail to evaluate a context related to the social media data such as related topics, timeline data for the social media data, contributors with a specific viewpoint, etc. A social graph takes social media data from social networking services and transforms the social media data to enable exploration of different levels of relationships for the social media data. For instance, extracted social media data may be evaluated (e.g., application of processing operations) and mined to generate clustered representations of relationships for specific social media data. In one example, a social graph may be used to generate temporal snapshots related to one or more social media identifiers. A temporal snapshot may provide an evolutionary context for a social media identifier. As an example, contextual aspects of a social media identifier such as #climatechange may be explored and provided in a temporal representation of a context for climate change at a given point in time. In examples, a temporal snapshot for #climatechange at the present time may be different from a temporal snapshot for #climatechange one year from now. Exemplary temporal snapshots enable users to explore different levels of interest related to social media data. For instance, a temporal snapshot may be generated that provides linked data, for a social media identifier, including related topics, contributors related to a context of the social media identifier and other social media links related to the social media identifier. However, temporal snapshots may comprise additional data that may be useful for the user to explore a context related to a social media identifier including but not limited to: timeline data for a social media identifier, knowledge data retrieved from resources separate from a social graph, and summary data for social media identifier, related topics, contributors, links, etc. Structuring of an exemplary social graph enables an application/service to provide richer results for social media data to different entry points for output of representations of the social media (e.g., temporal snapshots). Organization of data within the social graph further enables results data to be provided to entry points in an efficient processing manner. An entry point is a point of entry or platform for communication with an application or service for outputting/providing data to a processing device (and end user). In examples, an entry point may include but is not limited to: any applications/services including search applications, intelligent personal assistant applications, first-party products/services, second-party products/services, and third-party products/services, among other examples. As an example, an entry point may be used to provide generated temporal snapshots, pivot between links of temporal snapshots as well as update display of temporal snapshots based on receive query data.

Other examples described herein relate to navigation between content of temporal snapshots based on selection of linked data within a temporal snapshot, among other examples. A social graph may be configured to interface with entry points (e.g., providing of results data such as a temporal snapshot) to enable processing devices to pivot between topics/contributors/links for social media identifiers. For instance, a temporal snapshot may comprise a social media identifier and linked data to a contributor or expert on a topic of the social media identifier. A user may select linked data (from an exemplary temporal snapshot) for contributor data, resulting in processing operations that may pivot display from a generated temporal snapshot to an updated temporal snapshot (e.g., second temporal snapshot) with content related to the contributor. In one example, a temporal snapshot for a social media identifier such as #climatechange may include a link to a contributor such as Al Gore, who may be considered a contributor that a user may have an interest in following for matters related to global climate change. Continuing that example, a user may select linked data (from an exemplary temporal snapshot) for Al Gore, resulting in processing operations that may pivot display from a generated temporal snapshot to a temporal snapshot for content related to Al Gore including related content for global climate change. Such processing may enable devices to quickly and efficiently provide high-quality content to an end user, where different contextual aspects for social media identifiers can be explored without a user having to lookup such information.

Accordingly, the present disclosure provides a plurality of technical advantages including but not limited to: generation and management of an exemplary social graph, generation of exemplary temporal snapshots, ability to provide richer content results related to social media identifiers, improved user interaction with social media data, more efficient operation of a processing device (e.g., saving computing cycles/computing resources), for example, in providing representations of social media identifiers, extensibility to interface with different social networking services and different entry points, and reduction in latency for content transfer between processing devices/applications, among other examples.

Figure 2A:
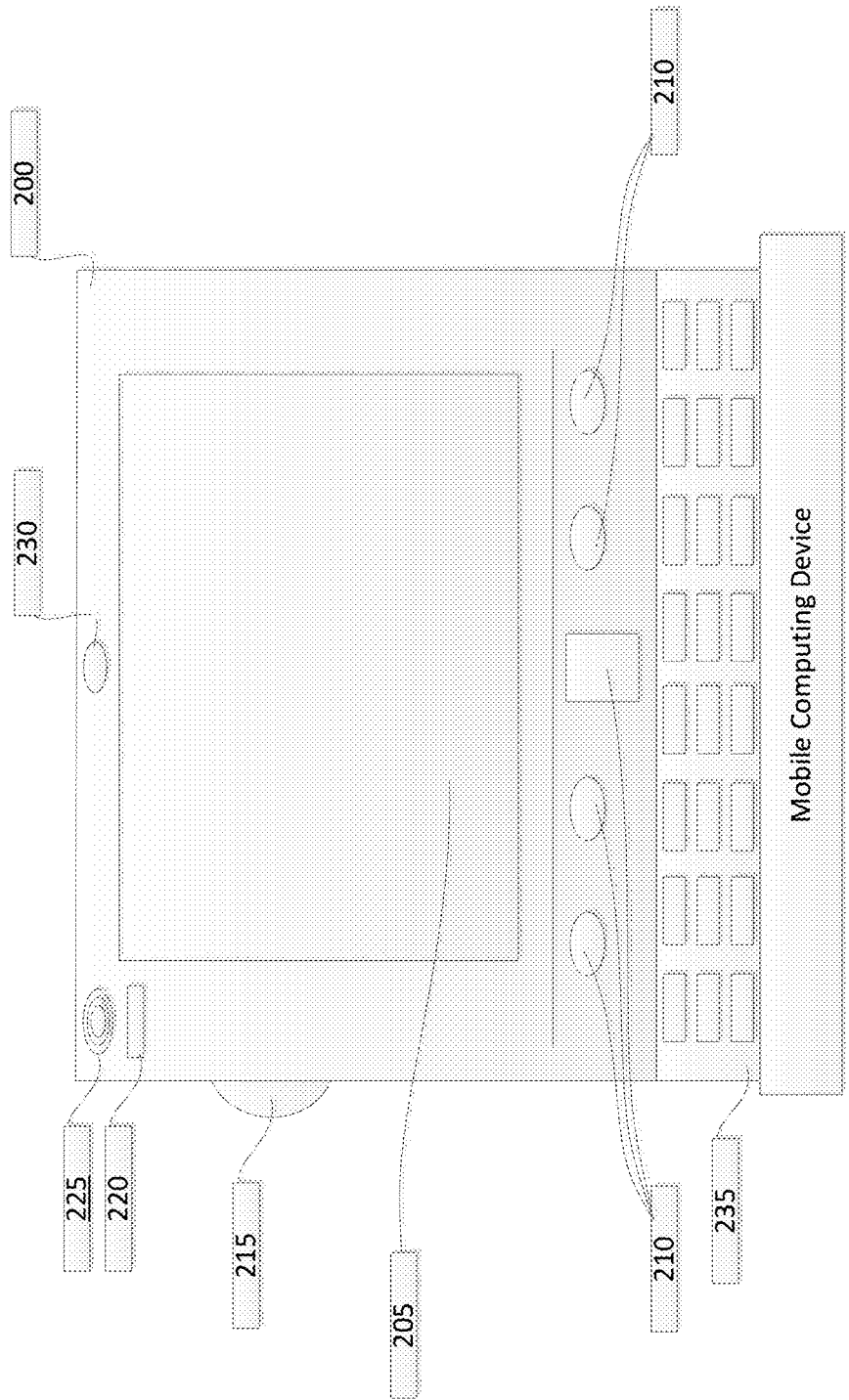
FIGS. 2A and 2B are simplified block diagrams of a mobile computing device with which aspects of the present disclosure may be practiced.
Figure 2B:
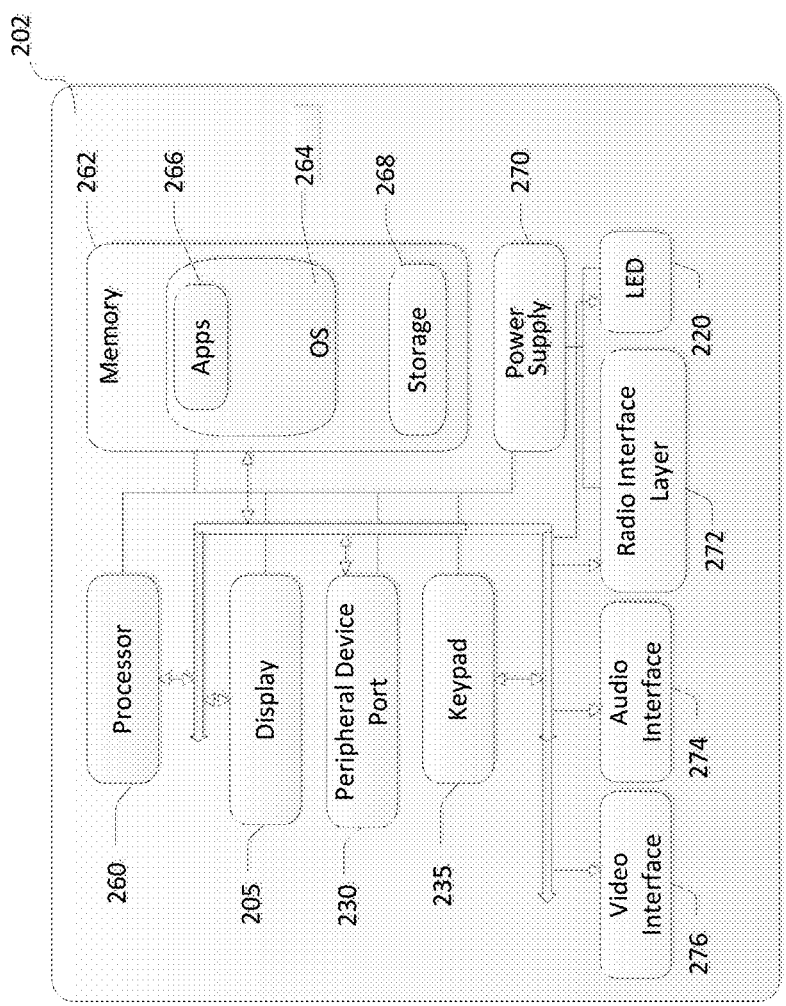
Figure 3:
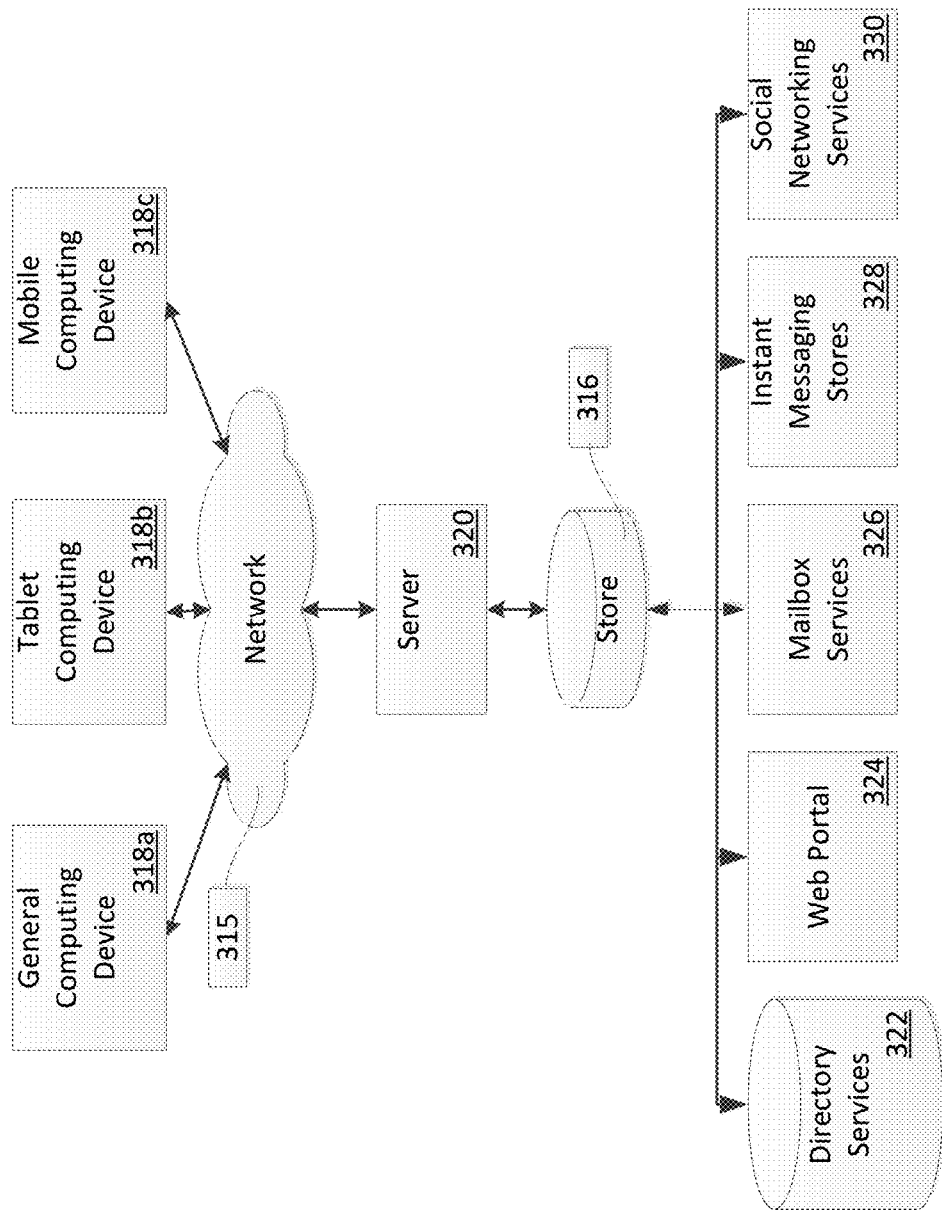
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of processing performed related to creation of a social graph and management (e.g. organization and output of) data from a social graph data as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for processing related to creation of a social graph and management (e.g. organization and output of) data from a social graph data as described herein. For example, mobile computing device 200 may be implemented to execute applications and/or application command control related to data generated from an exemplary social graph. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system for processing related to creation of a social graph and management (e.g. organization and output of) data from a social graph data as described herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

Figure 4:
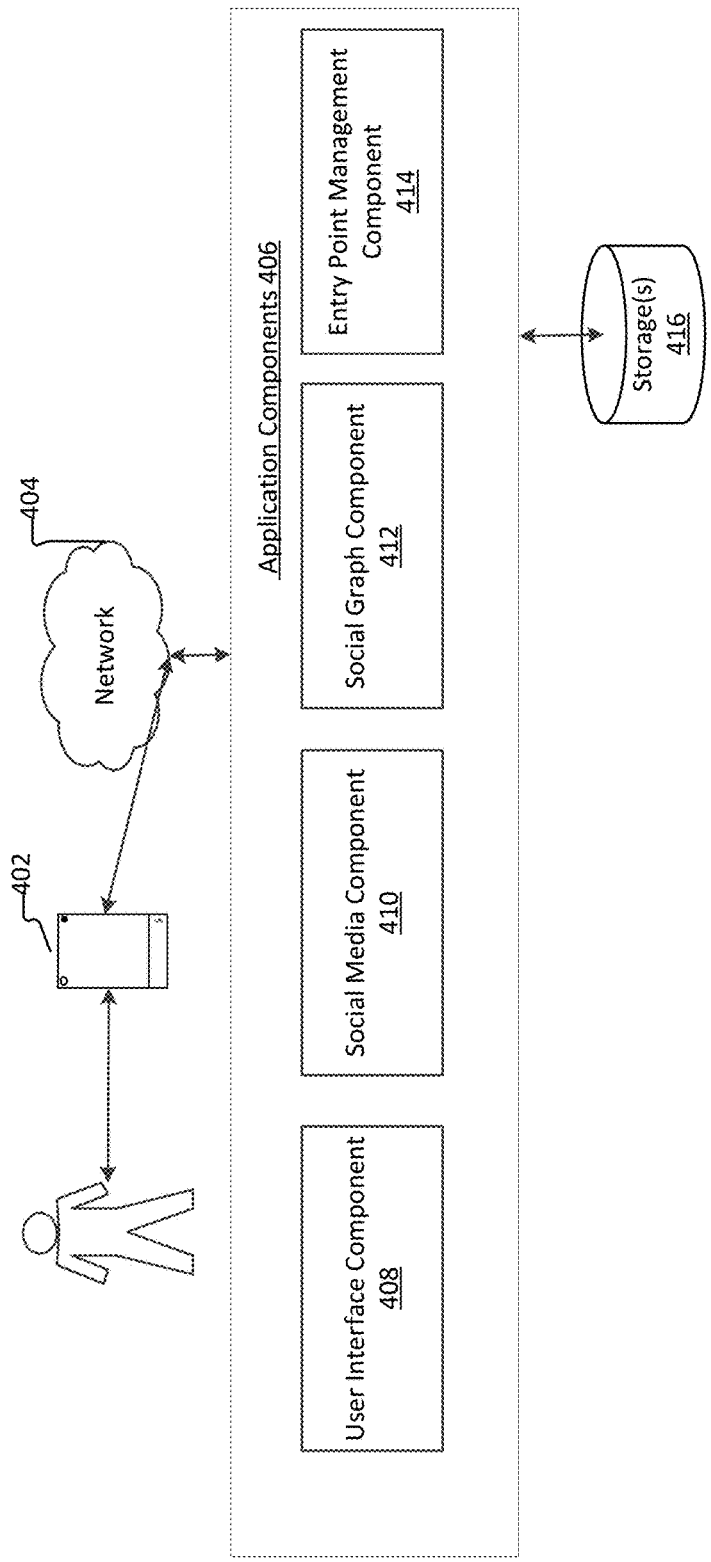
FIG. 4 illustrates an exemplary system implementable on one or more computing devices on which aspects of the present disclosure may be practiced.

FIG. 4 illustrates an exemplary system 400 implementable on one or more computing devices on which aspects of the present disclosure may be practiced. System 400 may be an exemplary system for processing related creation of a social graph and management (e.g. organization and output of) data from a social graph data as described herein. Exemplary system 400 presented is a combination of interdependent components that interact to form an integrated whole for learned program generation based on user example operations. Components of system 400 may be hardware components or software implemented on and/or executed by hardware components. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Components of the system 400 may interface with an OS of a processing device perform processing operations related to creation and display of representations of data provided by an exemplary social graph. Furthermore, it is presented that Application services components of system 400 may interface with other application services. Application services may be any resource that may extend functionality of one or more components of system 400. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 400.

Further, components of system 400 may possess processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces etc.), vehicular processing devices, and any other devices having at least one processor, among other examples. Exemplary system 400 comprises application components 406 including a user interface component 408, a social networking service component 410, a social graph component 412 and an entry point management component 414, where each of the identified components may comprise one or more additional components.

System 400 may further comprise one or more storages 416 that may store data associated with operation of one or more components of system 400. In examples, storages 416 may interface with other components of system 400. Data associated with any component of system 400 may be stored in storages 416, where components may be connected to storages 416 over a distributed network including cloud computing platforms and infrastructure services. Exemplary storages 416 may be any of a first-party source, a second-party source, and a third-party source. Storages 416 are any physical or virtual memory space. Storages 416 may store any data for processing operations performed by components of system 400, retained data from processing operations, stored programs, code or application programming interfaces (APIs), training data, links to resources internal and external to system 400 and knowledge data among other examples. Furthermore, in examples, components of system 400 may utilize knowledge data in processing by components of system 400. Knowledge may be used by one or more components of system 400 to improve processing of any of the application components 406 where knowledge data can be obtained from resources internal or external to system 400. In examples, knowledge data may be maintained in storage(s) 416 or retrieved from one or more resources external to system 400 by knowledge fetch operation. As an example, storages 416 may store user interface data/GUI data, social media data, data for interfacing with social networking services and entry points, social graph data, generated temporal snapshots, and processing operations related to creation and management of an exemplary social graph, among other examples.

In FIG. 4, processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more processors or circuits. In one example processing device 402 may be a device of a user that is executing applications/services. In examples, processing device 402 may communicate with the application components 406 via a network 404. In one aspect, network 404 is a distributed computing network, such as the Internet. Application services may communicate with application components 406 via the network 404. Processing device 402 may be a device as described in the description of FIGS. 1-3. In some examples, processing device 402 may comprise multiple connected devices.

The application components 406 are a collection of components that are used to create and manage social media data. Application components 406 may comprise a user interface component 408, a social media component 410, a social graph component 412 and an entry point management component 414. In alternative examples, one or more additional components may be created to manage operations described throughout the present disclosure. In different examples, the application components 406 may be used to execute independently from other application components 406. As an example, processing executed by any of the application components 406 may be performed by a processing device or incorporated into a product separately from processing performed by other components such as the user interface component 408 or the social graph component 412. Application components 406 may be stored on one or more processing devices (e.g., client device) or access to one or more of the application components 406 may be distributed, for example through a distributed network.

The user interface component 408 is one or more components that are configured to enable interaction with a user of a processing device. Transparency and organization are brought to users of a processing device through the user interface component 408 where a user can interact with a plurality of applications to retrieve temporal snapshot data rendered from an exemplary social graph. As an example, the user interface component 408 may comprise generation and display of one or more user interface elements that may be displayed upon a processing device during execution of one or more applications. The user interface elements may be graphical icons used to represent information associated with an application. The user interface component 408 may further execute as a front-end for display (e.g., graphical user interface) of back-end processing performed by the other application components 406. In examples, user interface definition files may be used to define user interface elements for fostering interaction between a processing device and applications/services that may be associated with management of data of an exemplary social graph. User interface definition files may comprise programming instructions or operations for management and display of user interface elements associated with user interface component 408. As an example, user interface elements may be used to illustrate operations including but not limited to: receiving a temporal snapshot, selection of linked data within a temporal snapshot, pivoting between linked data of temporal snapshots, receiving query data, displaying results data including generated temporal snapshots, and accessing application/services and/or other resources such as social networking services, etc. The user interface component 408 may further interface with the entry point management component 414 to manage query processing, transmission of processing operations to other application components 406, display of generated temporal snapshots, and pivoting between temporal snapshots, among other examples.

The social media component 410 is a component of the system 400 that may be used to interface with social networking services. The social media component 410 may be one or more executable programs, application programming interfaces (APIs), or any other collection of processing operations, functions, routines, protocols, and/or tools for building and executing software applications on one or more processing devices. Processing operations performed by the social media component 410 may enable system 400 to interface with social networking services to obtain social media data extracted from social networking services. As an example, the social media component 410 may be configured to obtain and/or receive social media data from social network services including third-party social networking services. In one example, the social media component 410 is configured to request social media data from a social networking service at predetermined time intervals. In another example, the social media component 410 may be configured to receive social media data from social networking services when social media data is posted within the social networking service. In yet another example, the social media component 410 is configured to scan one or more social networking services to identify and extract social media data. Social media data may be transmitted to and received at system 400 in any form.

The social media component 410 is configured to interface with other application components such as the social graph component 412 to utilize the extracted social media for creation and management of an exemplary social graph. In at least one example, the social media component 410 is configured to receive and process social media data before providing such data to the social graph component 412. For instance, processing operations may be performed to execute N-gram analysis of social media identifiers of the social media data. Processing operations for contextual analysis of an n-gram for a particular social media data may be performed to generate an exemplary social graph identifying related content for social media data including related links, related topics, and contributors for a particular social media data. In some examples, processing operations may be applied to determine social media identifiers that may be a topic of interest (e.g., prominent topic or viral/trending topic). Threshold analysis may be applied to determine social media identifiers that are topics of interest (e.g., trending or viral), where social media data extracted from social networking services may be evaluated to determine social media identifiers to include in a social graph. For example, processing operations may evaluate aspects of the social media data including but not limited to: words/phrases/symbols etc. that are included in a social media identifier, context of the social media identifier, number of users who liked/posted/tweeted/re-tweeted the social media identifier, number of appearances across social networking service platforms, prominent persons who included the social media identifier, as well as other resources including knowledge data obtained from other sources/services, among other examples. The social media component 410 may propagate a number of social media identifiers to the social graph component 412 for further processing. In alternative examples, the social graph component 412 may execute the above described processing operations related to identification of topics of interest to include in an exemplary social graph.

The social graph component 412 is an application component that may generate and manage one or more exemplary social graphs. As identified above, an exemplary social graph is a representation of interconnection between relationships in social media data extracted from one or more social network services and augmentation of data during processing of the social media data. A social graph takes social media data from social networking services and transforms the social media data to enable exploration of different levels of relationships for the social media data. For instance, the social graph components may execute processing operations that evaluate extracted social media data to generate clustered representations of relationships for specific social media data.

In one example, a social graph may be used to generate temporal snapshots related to one or more social media identifiers. A temporal snapshot may provide an evolutionary context for a social media identifier. Exemplary temporal snapshots enable users to explore different levels of interest related to social media data. For instance, a temporal snapshot may be generated that provides linked data, for a social media identifier, including related topics, contributors related to a context of the social media identifier and other social media links related to the social media identifier. A temporal snapshot is not limited to the foregoing example and may include more than one social media identifier, related social media link, links to related topics, and links to contributors, among other types of data. Temporal snapshots may comprise additional data that may be useful for the user to explore a context related to a social media identifier including but not limited to: timeline data for a social media identifier, knowledge data retrieved from resources separate from a social graph, and summary data for social media identifier, related topics, contributors, links, etc. Structuring of an exemplary social graph enables an application/service to provide richer results for social media data to different entry points for output of representations of the social media (e.g., temporal snapshots). Organization of data within the social graph further enables results data to be provided to entry points in an efficient processing manner.

The social graph component 412 may further manage update and extensibility of an exemplary social graph. For instance, additional social media data may be received and evaluated for incorporation into an exemplary social graph (or alternatively create additional social graphs). Furthermore, the social graph component 412 may interface with the entry point management component 414 to control output of temporal snapshot data from the social graph component 412. Query data may further be passed between application components (e.g., user interface component 408, social graph component 412 and entry point management component 414) for use of an exemplary social graph to generate data that can be provided to a processing device of an end user.

Figure 11A:
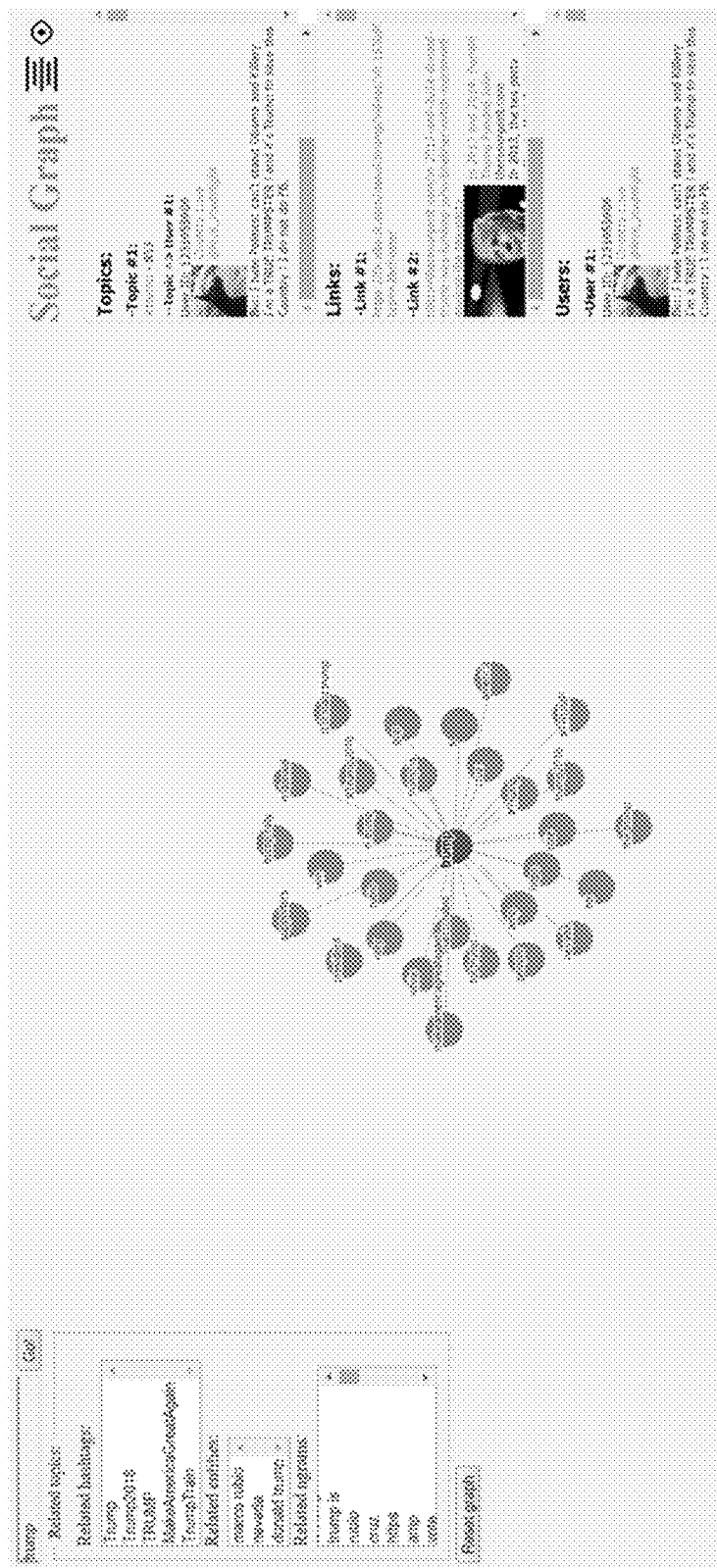
FIGS. 11A and 11B are processing device views of output of social graph data with which aspects of the present disclosure may be practiced.
Figure 11B:
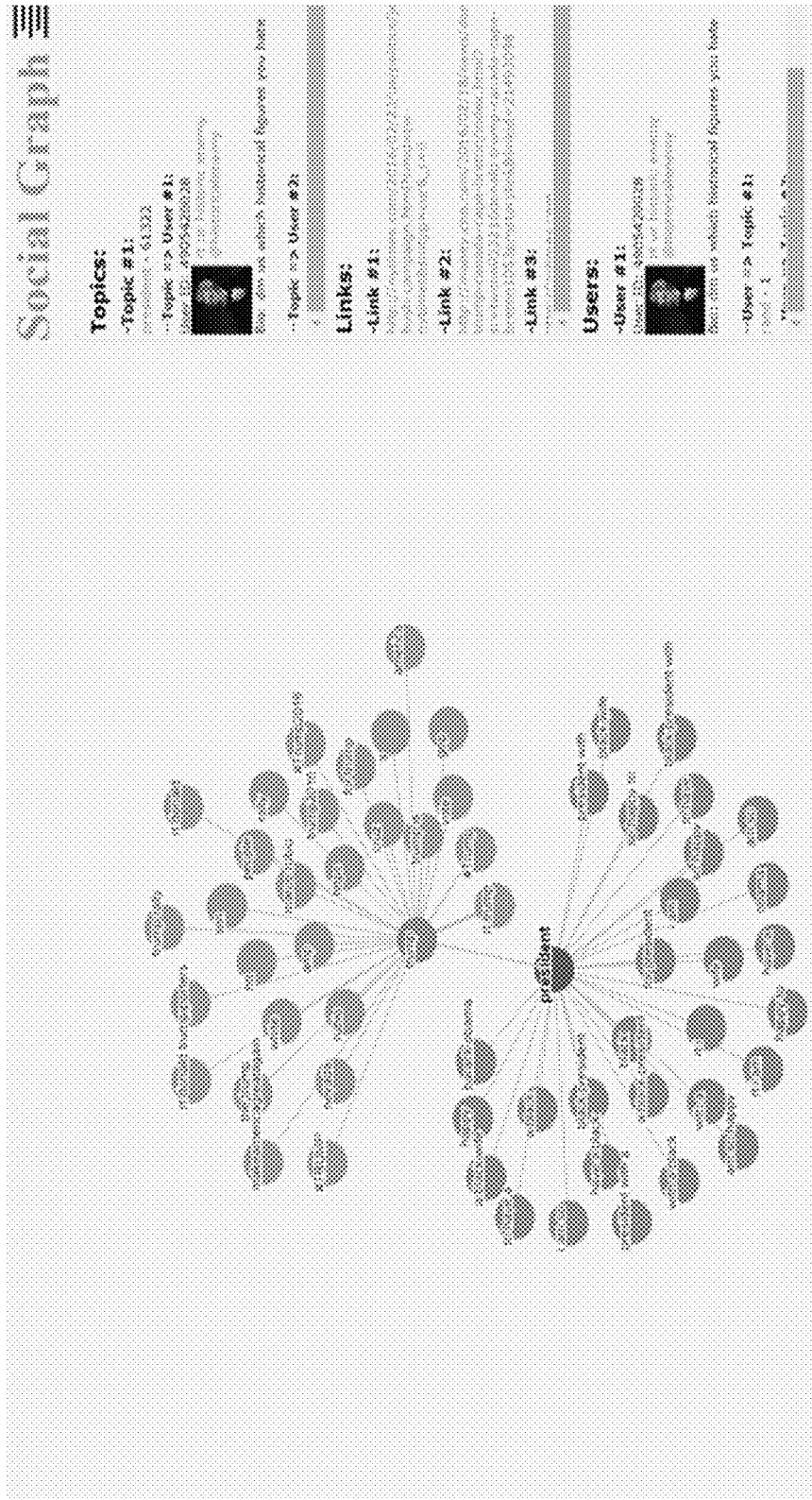

Moreover, an exemplary social graph may be accessed directly by a user. In one example, a user is an end user. In another example, a user may be an administrator or developer. The social graph component 412 may comprise an application and/or service that may be configured to enable access to social graph. In another example, an application may interface with the social graph component 412 to enable access to data extracted from an exemplary social graph. Refer to FIGS. 11A and 11B for processing device views of an exemplary social graph application and displayed output of social graph data.

The entry point management component 414 is an application component that may be configured to manage output of data from an exemplary social graph at one or more entry points. As identified above, an entry point is a point of entry or platform for communication with an application or service for outputting/providing data to a processing device (and end user). In examples, an entry point may include but is not limited to: any applications/services including search applications, intelligent personal assistant applications, first-party products/services, second-party products/services, and third-party products/services, among other examples. As an example, an entry point may be used to provide generated temporal snapshots, pivot between links of temporal snapshots as well as update display of temporal snapshots based on received query data. In one example, the entry point management component 414 may receive query data, for example, about a discussion, a topic, a contributor, a tweet, a link or a related n-gram, etc. In another example, a module, API, program, etc. may be inserted into different websites or mobile applications to enable display of data (e.g., temporal snapshots) retrieved from an exemplary social graph. In other examples, the entry point management component 414 may receive a temporal snapshot from the social graph component 412 for display through a processing device executing an entry point. For instance, the social graph component 412 may identify relevant or trending topics and provide such data to an entry point, for example, to display in a feed of topical content.

In some examples, the entry point management component 414 may control display of data received from the social graph component 412. For instance, the entry point management component 414 may provide alternative views for created temporal snapshots and/or any other data received from the social graph component 412 or other resources. However, in other examples, the entry point management component 414 may simply display content received from the social graph component 412. For instance, the social graph component 412 may generate a variety of temporal snapshots for a social media identifier, where the entry point management component 414 may display one or more of the temporal snapshots and/or rotate display of different temporal snapshots.

Furthermore, the entry point management component 414 may identify selection of a link within a temporal snapshot and interface with the social graph component 412 to update display of data within an entry point executing on a processing device. For instance, a user may select linked data within a temporal snapshot, communicate selection of the linked data to the social graph component 412, and receive updated data to display within an entry point. The entry point management component 414 may pivot display from a first temporal snapshot to another temporal snapshot. In one example, a selection of a link in a temporal snapshot may be a link to a related social media identifier or contributor to a social media identifier. Display may be updated or pivoted to focus on the selected link. In doing, so an exemplary social graph may be used to explore the clustered relationships within the social graph and output an updated temporal snapshot for display within an entry point.

Figure 5:
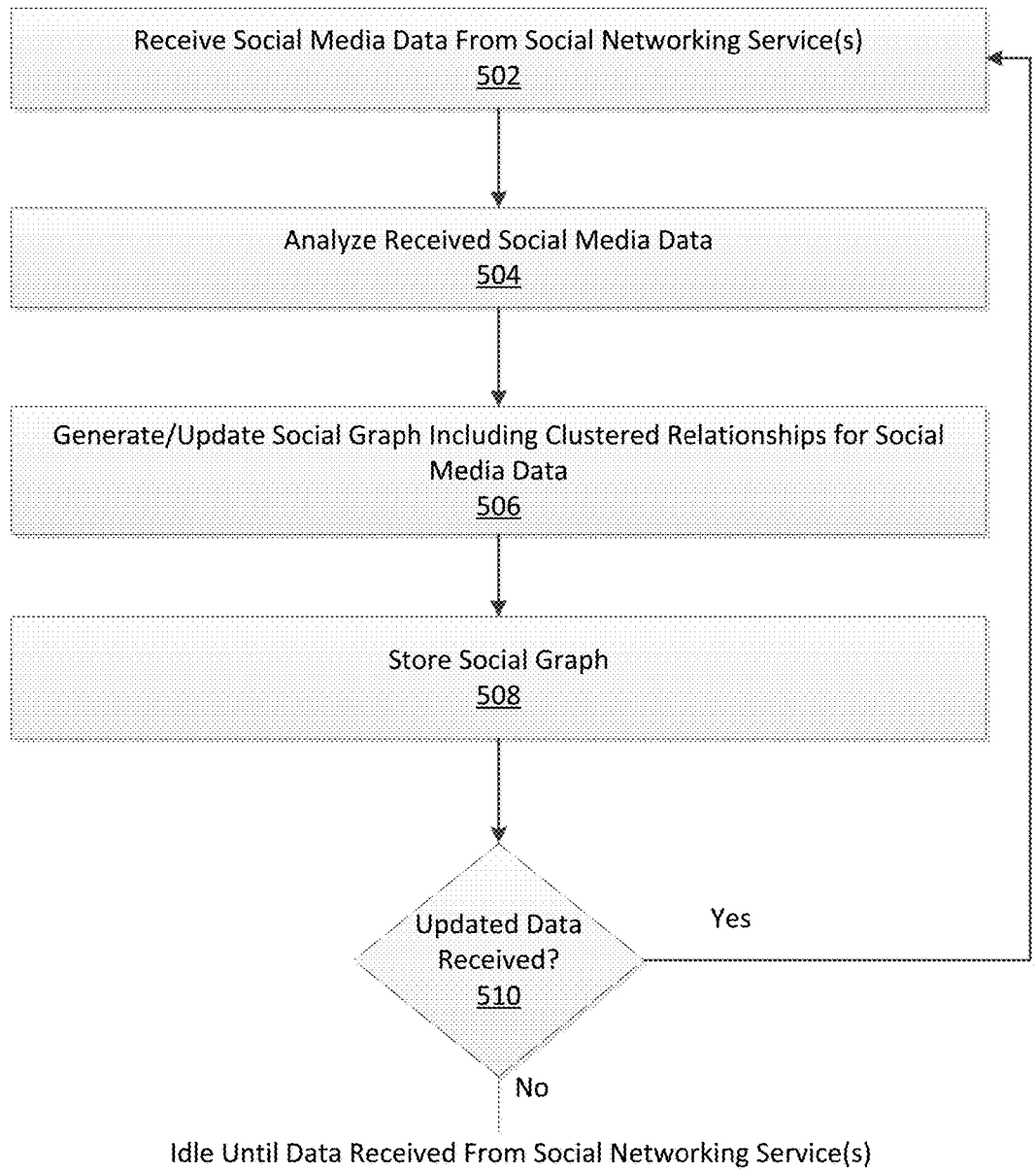
FIG. 5 is an exemplary method for generation and management of an exemplary social graph with which aspects of the present disclosure may be practiced.

FIG. 5 is an exemplary method for generation and management of an exemplary social graph with which aspects of the present disclosure may be practiced. As an example, method 500 may be executed by an exemplary processing device and/or system such as those shown in FIGS. 1-4. In one example, system 400 of FIG. 4 describes examples of components that may be used for implementation of method 500. In examples, method 500 may execute on a device comprising at least one processor configured to store and execute operations, programs or instructions. For instance, method 500 may be processing operations executed by a client device such as processing device 402 described in FIG. 4. However, method 500 is not limited to such examples. In at least one example, method 500 may be executed (e.g., computer-implemented operations) by one or more components of a distributed network, for instance, web service/distributed network service (e.g., cloud service). Operations performed in method 500 may correspond to operations executed by a system and/or service that execute computer programs, application programming interfaces (APIs), or machine-learning processing, among other examples.

Method 500 begins at operation 502 where social media data is received from one or more social networking services. As identified above, social media data may be extracted from a social networking service, where the social media data may be further evaluated and processed to generate an exemplary social graph. In one example, social media data may be obtained by a component such as social media component 410 and/or the social graph component 412 as described in FIG. 4. However, in alternative examples, social media data may be obtained through processing operations for extracting social media data directly from social networking services.

Flow may proceed to operation 504, where the social media data is analyzed. Examples of analysis of social media data are provided with respect to the description of FIG. 4. For instance, social media data may be evaluated and augmented by a component such as the social media service component 410 and/or the social graph component 412 as described in FIG. 4. In examples, social media data extracted from social networking services may be evaluated to determine social media identifiers to include in a social graph. For instance, processing operations may be performed to execute N-gram analysis of social media identifiers of the social media data. Processing operations for contextual analysis of an n-gram for a particular social media data may be performed to generate an exemplary social graph identifying related content for social media data including related links, related topics, contributors for a particular social media data, among other examples. For example, processing operations may evaluate aspects of the social media data including but not limited to: words/phrases/symbols etc. that are included in a social media identifier, context of the social media identifier, number of users who liked/posted/tweeted/re-tweeted the social media identifier, number of appearances across social networking platforms, prominent persons who included the social media identifier, as well as other resources including knowledge data obtained from other sources/services, among other examples.

Flow may proceed to operation 506, where an exemplary social graph may be managed. Operation 506 may comprise generating a social graph based on processing operations executed upon social media data. In at least one example, operation 506 may comprise incorporating data other than social media data into the social network graph, for example, making the connections within the social network graph more robust. As an example, a knowledge graph, separate from a social graph, may be referenced to incorporate linked data and relationships between social media identifiers. In examples where a social graph is created, operation 506 may comprise developing nodes that identify interrelated relationships with social media data such as a social media identifier. For instance, clustered groups of links may be identified, where the social graph may identify the relationships between social media identifier and the clustered groups of links. Associations between nodes are made in generating an exemplary social graph. When referenced, the social graph enables quick and efficient identification of high-quality content including closely related content as well as higher and lower level clusters (e.g. related topic, more general topic or more specific topic) for content that can be associated with a social media identifier. Furthermore, users can be interested into micro or macro part of a topic. In order to enable different levels of content to be incorporated into a temporal snapshot, an exemplary social graph clusters data (e.g. social media data or other associated data) not only by n-grams but also by discussion topics such as hashtags, for example, that are dynamically created based on evolving interest of users. Processing operations may be applied to determine trending or viral content and how to manage clustered relationships for such content within an exemplary social graph. For example, ranked listings of data may be maintained in clustered relationships. Processing operations may be applied to curate the list of ranked data, where the ranked data may be output for display by an entry point.

Operation 506 may further comprise updating an existing social graph including update of clustered relationships for social media data such as a social media identifier. Areas of interest keep changing overtime as new products and industry gets created and new social media data is created. A social graph may be updated as new social media data is added. Relationships in a social graph may be evaluated/re-evaluated over time to keep social graph data up to date. In one example, temporal snapshots may be generated and stored to capture a context of the social graph at a particular point in time.

Flow may proceed to operation 508, where an exemplary social graph is stored. In examples, social graph(s) and related data may be stored in one or more storages such as storage(s) 416 as described in the description of FIG. 4. A stored social graph may be accessed for the generating of temporal snapshots and the transmission of social graph data to one or more entry points.

Flow may proceed to decision operation 510 where it is determined whether an updated social media data is received. In a case where updated social media data is received, flow branches YES and returns to operation 502. If no updated social media data is received, flow branches NO and remains idle until data is received from one or more social networking service(s).

In alternative examples, a stored social graph may be output for display. An application may be developed that enables users to view data of an exemplary social graph. See FIG. 11 for an example of an output of social graph data.

Figure 6:
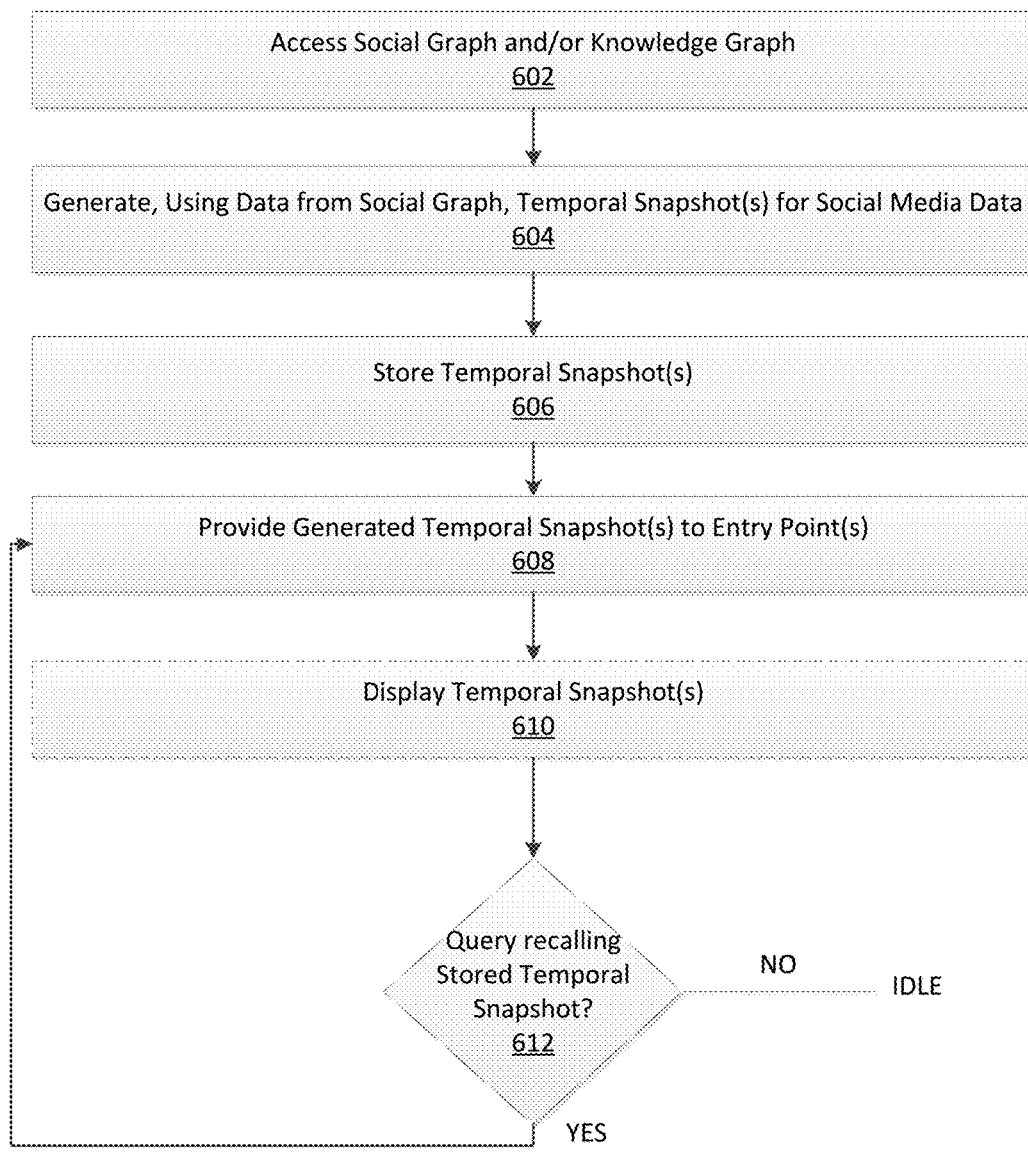
FIG. 6 is an exemplary method for generation and management of an exemplary temporal snapshot with which aspects of the present disclosure may be practiced.

FIG. 6 is an exemplary method for generation and management of an exemplary temporal snapshot with which aspects of the present disclosure may be practiced. As identified above, an exemplary temporal snapshot may be created from an exemplary social graph. As an example, method 600 may be executed by an exemplary processing device and/or system such as those shown in FIGS. 1-4. In one example, system 400 of FIG. 4 describes examples of components that may be used for implementation of method 600. In examples, method 600 may execute on a device comprising at least one processor configured to store and execute operations, programs or instructions. However, method 600 is not limited to such examples. In at least one example, method 600 may be executed (e.g., computer-implemented operations) by one or more components of a distributed network, for instance, web service/distributed network service (e.g., cloud service). Operations performed in method 600 may correspond to operations executed by a system and/or service that execute computer programs, application programming interfaces (APIs), or machine-learning processing, among other examples.

Method 600 begins at operation 602 where a social graph is accessed. Creation and management of data of a social graph are described above in the foregoing description. In some examples, operation 602 may further comprise accessing knowledge data that may be maintained in a knowledge graph separate from the social graph. A knowledge graph may be any knowledge base that can be used to enhance semantic understanding of content including social media data. A knowledge graph may be an aggregation of information gathered from a wide variety of sources. Operation 602 may comprise accessing one or more of the social graph and a knowledge graph to generate an exemplary temporal snapshot.

Figure 10:
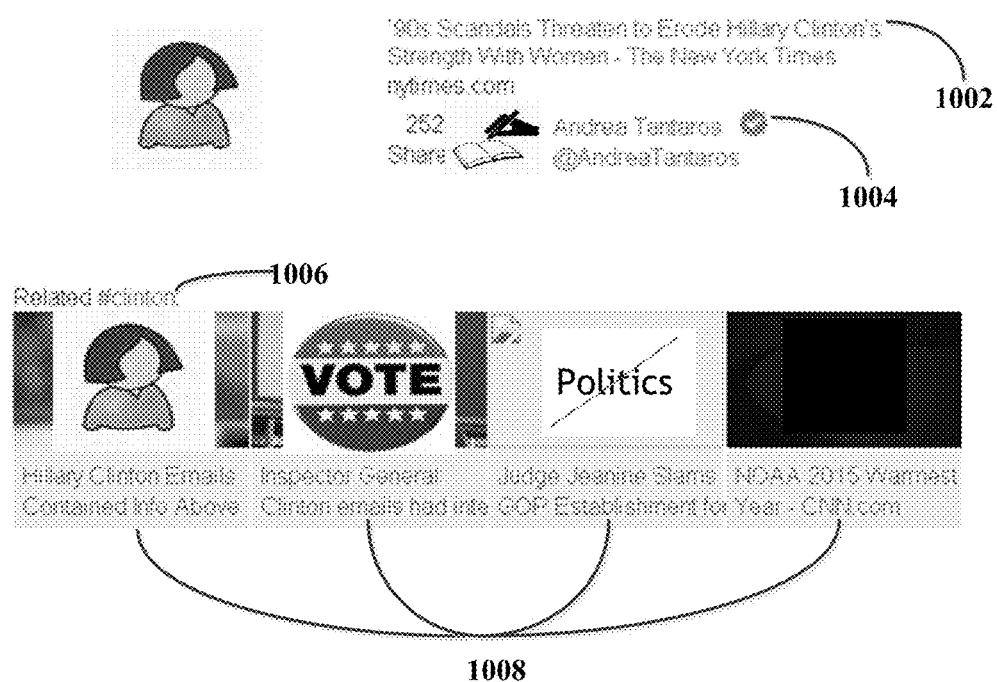
FIG. 10 is a processing device view of exemplary temporal snapshot with which aspects of the present disclosure may be practiced.

Flow may proceed to operation 604, where one or more temporal snapshots may be generated for social media data. While examples described herein relate to generation of temporal snapshots for social media data, similar processing operations may be applied to generate temporal snapshots for other types of information. As such, it should be recognized that generation of a temporal snapshot may include but is not limited to just social media data. Operation 604 may generate a temporal snapshot from an exemplary social media graph and/or knowledge data obtained from a knowledge graph. Examples of temporal snapshots have been described above in the foregoing description. Exemplary temporal snapshots are illustrated in FIGS. 9-10. A temporal snapshot may comprise a social media identifier as well as other related content based on a contextual analysis of the social media identifier. Related content including links, topics, contributors for a social media identifier, where content of the temporal snapshot may be determined from processing operations that perform a contextual analysis of social media data or an n-gram from a particular social media data. In one example, a temporal snapshot may comprise: a social media identifier, a related social media link corresponding with the social media identifier, a link to a related topic for the social media identifier, and a link to a contributor for context of the social media identifier. In at least one example, a social media identifier is at least one selected from a group consisting of: a hashtag extracted from the at least one social networking service and a uniform resource identifier extracted from the at least one social networking service.

A temporal snapshot may further comprise a summary of content (e.g., article or topic) related in context to the social media data such as a social media identifier. One skilled in the art should recognize that summary data may be generated for any type of information included within a temporal snapshot. An example of a summary is shown in FIG. 9, where a related topic includes a brief description of the context of the related topic. In another example, a temporal snapshot temporal may comprise links to two or more related topics for the social media identifier, where the links to the two or more related topics are presented in a chronological order. An exemplary temporal snapshot may further comprise knowledge data extracted from a knowledge graph, wherein the knowledge data is related to the context of the social media identifier or a topic that is relevant or related to the social media identifier.

In another example, a temporal snapshot may comprise location data corresponding to the context of the social media identifier. For instance, location information related to where the social media data is referring or where events are occurring may be included within a temporal snapshot. In one example, generation (operation 604) of a temporal snapshot may comprise tailoring temporal snapshots to a particular geographic region. As an example, a temporal snapshot may be generated for a first geographic location (e.g., France) and a second temporal snapshot may be generated for a second geographic location (e.g. U.S.). An entry point may utilize particular geographic temporal snapshots to provide tailored results to an end user of any geographic region or to enable end users to obtain information about specific geographic regions.

In another example, more than one temporal snapshot may be generated to provide different content and contexts for a social media identifier. Consider an example where a social media identifier of a collaborative conversation comprises a political view regarding a topic such as a universal healthcare plan. An exemplary temporal snapshot may be generated to provide a temporal view of universal healthcare and related information from a Republican perspective and another exemplary temporal snapshot may be created for a temporal view of the same issue from a Democratic perspective, among other examples.

Flow may proceed to operation 606, where a temporal snapshot is stored. As an example, a temporal snapshot may be stored on a storage/storage device or multiple storage devices spread across a distributed network. An exemplary storage is storage 416 as described in the description of FIG. 4.

Furthermore, for a social media identifier displayed in a temporal snapshot, processing operations may be applied to modify and/or provide context for the social media identifier. For example instead of showing "#tcot" (which is an abbreviation a user may not readily identify), generation of a temporal snapshot may show "#tcot (top conservative on twitter)". One skilled in the art should recognize that content included within a temporal snapshot may vary and can be modified by developers to provide greater contextual understanding of content.

A generated temporal snapshot is provided (operation 608) to an exemplary entry point. As identified above, an entry point is a point of entry or platform for communication with an application or service for outputting/providing data to a processing device (and end user). In examples, an entry point may include but is not limited to: any applications/services including search applications, intelligent personal assistant applications, first-party products/services, second-party products/services, and third-party products/services, among other examples. As an example, an entry point may be used to provide generated temporal snapshots, pivot between links of temporal snapshots as well as update display of temporal snapshots based on receive query data. In one example, an exemplary entry point is separate from the at least one social networking service. For instance, a temporal snapshot may be transmitted (operation 608) to a search engine service for output of the temporal snapshot. A temporal snapshot may be displayed (610), for example, on a processing device executing an application/service for an entry point.

After a temporal snapshot is generated, the temporal snapshot may be transmitted to an entry point at any point in time after generation. In some examples, query data may comprise a request for a specific temporal snapshot, which may trigger generation of a temporal snapshot or trigger re-calling of an already generated temporal snapshot. Flow may proceed to decision operation 612, where it is determined if a query is requesting data related to a temporal snapshot. In response to a received query including query data, processing operations may occur to match data of the query to a stored temporal snapshot. If a stored temporal snapshot is identified, the stored temporal snapshot may be re-called and transmitted to the entry point. In other cases, processing operations of received query data may result in generation of a new temporal snapshot based on processing operations that utilize an exemplary social graph. If no request for a stored temporal snapshot is received, flow branches NO and processing may remain idle until a temporal snapshot is generated or a request is made for a stored temporal snapshot. If a request for a stored temporal snapshot is received, flow branches YES and processing returns to operation 608, where a temporal snapshot may be provided to an entry point.

Figure 7:
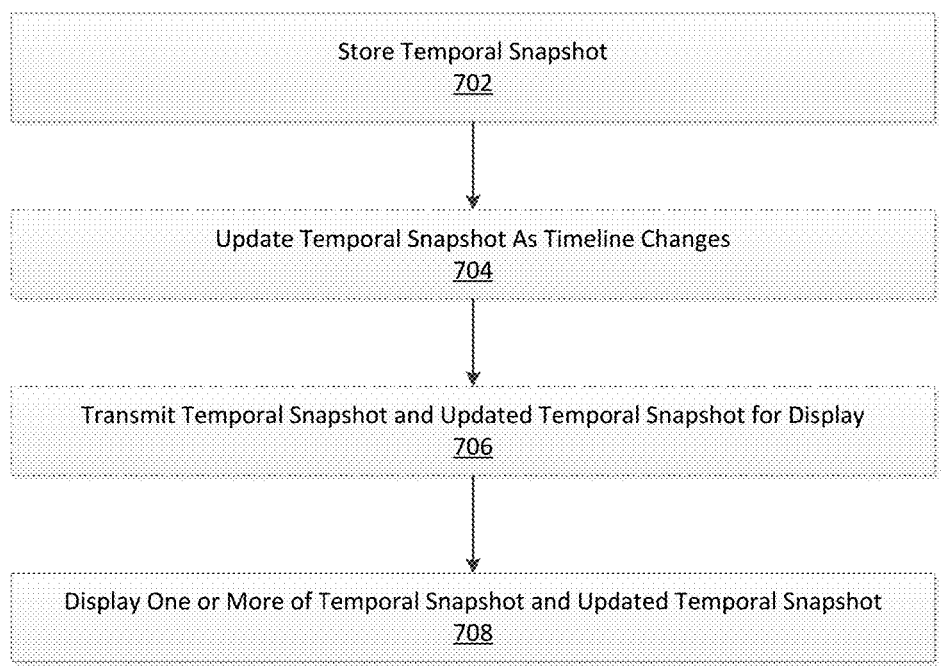
FIG. 7 is an exemplary method for management of multiple temporal snapshots which aspects of the present disclosure may be practiced.

FIG. 7 is an exemplary method for management of multiple temporal snapshots which aspects of the present disclosure may be practiced. As an example, method 700 may be executed by an exemplary processing device and/or system such as those shown in FIGS. 1-4. In one example, system 400 of FIG. 4 describes examples of components that may be used for implementation of method 700. In examples, method 700 may be executed on a device comprising at least one processor configured to store and execute operations, programs or instructions. However, method 700 is not limited to such examples. In at least one example, method 700 may be executed (e.g., computer-implemented operations) by one or more components of a distributed network, for instance, web service/distributed network service (e.g., cloud service). Operations performed in method 700 may correspond to operations executed by a system and/or service that execute computer programs, application programming interfaces (APIs), or machine-learning processing, among other examples.

Method 700 begins at operation 702 where a generated temporal snapshot may be stored for output. As an example, a temporal snapshot may be stored on a storage/storage device or multiple storage devices spread across a distributed network. An exemplary storage is storage 416 as described in the description of FIG. 4.

In some examples, flow may proceed to operation 704, where a temporal snapshot may be updated. In one example, an existing temporal snapshot may be modified. Social media data is constantly evolving where context associated with the social media data, relevance of the social media (e.g., trending/viral content) and related content may change over time. In other examples, updating (operation 704) may comprise generating additional temporal snapshots as a topic evolves. For instance, a temporal snapshot may be created for a specific social media data (e.g., social media identifier) and stored. As context and related content changes over time, additional temporal snapshots may be created.

Flow may proceed to operation 706, where one or more temporal snapshots are transmitted for display. As an example, a first temporal snapshot and a second temporal snapshot (e.g., updated temporal snapshot) may be transmitted to an application/service associated with an entry point for output of the generated temporal snapshots. Flow may proceed to operation 708, where one or more of the temporal snapshots may be displayed. Operation 708 may comprise displaying a temporal snapshot and/or an updated temporal snapshot on a display connected with (or incorporated within) a processing device.

FIG. 8 is an exemplary method for processing related to pivoting an exemplary temporal snapshot with which aspects of the present disclosure may be practiced. As an example, method 800 may be executed by an exemplary processing device and/or system such as those shown in FIGS. 1-4. In one example, system 400 of FIG. 4 describes examples of components that may be used for implementation of method 800. In examples, method 800 may be executed on a device comprising at least one processor configured to store and execute operations, programs or instructions. However, method 800 is not limited to such examples. In at least one example, method 800 may be executed (e.g., computer-implemented operations) by one or more components of a distributed network, for instance, web service/distributed network service (e.g., cloud service). Operations performed in method 800 may correspond to operations executed by a system and/or service that execute computer programs, application programming interfaces (APIs), or machine-learning processing, among other examples.

Method 800 begins at operation 802, where a selection of a link is received. As an example, a link may be selected in an exemplary temporal snapshot that is described in at least the foregoing. Exemplary temporal snapshots are further illustrated in FIGS. 9-10, for example.

Flow may proceed to operation 804, where a temporal snapshot may be generated. In one instance, an exemplary temporal snapshot may comprise: a social media identifier, a related social media link corresponding with the social media identifier, a link to a related topic for the social media identifier, and a link to a contributor for context of the social media identifier, among other content. As an example, operation 804 may comprise generating a temporal snapshot related to the selection of the link. For example, a temporal snapshot may be display content related to a social media identifier. A selection of a link (by a user via a processing device) within a temporal snapshot where a new temporal snapshot may be generated that provides context and content related to the selected link. In other examples, selection of the link may result in recall of an already generated temporal snapshot. For instance, when a link is selected, data may be transmitted to one or more processing devices corresponding to temporal snapshot management, where a generated temporal snapshot may be transmitted to an entry point for displaying a temporal snapshot that corresponds with the selected link.

Flow may proceed to operation 806, where a temporal snapshot may be pivoted to reflect selection of the link. Pivoting (operation 806) between connections within temporal snapshots can help create a richer experience and help create a new way of discovering and finding content. As an example, operation 806 may comprise pivoting display of the temporal snapshot to an updated temporal snapshot that features at least one of the related social media link, the link to the related topic, and the link to the contributor.

In one example, when a user selects a link such as an article, the user experience can show a preview of a link including article title, article snippet/description and its related context. The context may come from processing operations that find entities and social media identifiers related to the selected link. This may help provide context to the content and help a user to further explore topics of interest. Selection of a particular link within a temporal snapshot can also help a search engine service to choose the best re-query experience to highlight good supplemental information from image, video, audio, knowledge graph data, web search, etc.

Furthermore, in another example, top experts/influencers/contributors may be incorporated in a temporal snapshot. This allows a user to click to pivot to a temporal snapshot highlighting a contributor view, which can show everything this contributor has shared or a filtered view focused on a topic of interest. As an example, when showing a temporal snapshot that illustrates a contributor view, links to other users/persons that the contributor may interact with may also be displayed. This may help a user to see who the contributor may interact with to further explore context and related content for a selected link.

In yet another example, a selection of link may pivot display of a temporal snapshot to specific content that a user may be interested in. For instance, selection of a link may pivot display of a temporal snapshot to content determined based on processing operations related to clustered data within a social graph, where the content may include but is not limited to: closely related topics (related to the selected link), higher level topics (e.g. parent topics/categorized information extracted from a social graph for content related to a selected link), lower level topics (e.g. sub-topics/child nodes extracted from a social graph for content related to a selected link), exploratory topics (e.g., content extracted from social graph that is part of popular clusters such as content that may be breaking news, trending, viral, etc.) and direct links to specific content available over the Internet, among other examples.

In examples, specific content from a temporal snapshot such as a social media identifier, contributor, topic, etc., may be actively followed by the user. Once the user finds something of interest, he/she might want to track it so a product or feature can notify them of new interesting information. For example, if a user identified an expert on tennis tournaments, the user may desire to follow the expert for shared content related to tennis.

Flow may proceed to operation 808, where display of a temporal snapshot is pivoted to reflect selection of linked data from a previously displayed temporal snapshot. Examples of display of a temporal snapshot have been described in the previous description. An illustration of pivoting of temporal snapshots can be further understood from exemplary processing device views shown in FIGS. 9 and 10.

FIG. 9 illustrates a processing device view 900 of an exemplary temporal snapshot with which aspects of the present disclosure may be practiced. Processing device view 900 is an example of a processing device view for a processing device during display of a temporal snapshot. Selection of content within an exemplary temporal snapshot may trigger pivoting from a temporal snapshot to another temporal snapshot or direct links to other content available over the Internet. In one example, processing device view 900 may be a processing device view from a client device such as processing device 402 as described in FIG. 4.

As shown in FIG. 9, a temporal snapshot for a social media identifier such as #Global Warming is displayed. Processing device view 900 comprises social media identifiers that may be related to a context of #Global Warming. For example, related social media identifiers may include #ClimateChange, #GreenhouseGases. Further, a link to a contributor (e.g., Al Gore) is further included in the generated temporal snapshot displayed in processing device view 900. A user may be interested to follow a contributor (e.g., Al Gore) for a topic of climate change and/or other topics of interest. When a contributor is identified, the user may care about what the contributor has to say about other topics. Interest in a contributor and/or topic may evolve over time. Additionally, links to related topics/content are also included in the displayed temporal snapshot. One of the problems when consuming news around a specific event or topic is that the article tends to talk about the latest update. Historical context or a summary of what happened or how a topic evolves is typically not provided. In examples described herein, a temporal snapshot may comprise a timeline view can help the user get a quick summary of the top salient articles around a topic. For instance, relevant information on a topic such as global warming could be presented to highlight progression of content including earlier content dating as far back as can be found. Processing device view 900 illustrates a timeline event view of content related to a social media identifier of #GlobalWarming. Included within processing device view 900 is related content in an organized manner, where a user can scroll through content dating as far back (or as far forward in a case where a user is focusing on a specific timestamp of related content). This may allow the user to catch up and get a better understanding of a starting point and the progression of a context for a social media identifier.

Timeline event data incorporated within a temporal snapshot may be configured to be explored in different ways. In one example, a temporal snapshot may comprise links/topics/contributors that are relevant at a given point in time and provide timeline information that summarizes the evolution of one or more of the links/topics/contributors. In another example, a generated temporal snapshot may be a time-ranged snapshot. For instance, a user may specify a time-range to detail information related to a specific social media identifier, link, topic, contributor, etc. In an example, a user interface element may be presented within the application interface that may be configured to enable a user to specify a time-range for filtering of social graph data. As one example, the user interface element may be presented as temporal slider (or similar filter) that enables a user to select a time-range for filtering social graph data. In another example, the user interface element may be presented as data input fields that are configured to enable a user to enter specific dates for time-range filtering. Placement and display of such an exemplary user interface element may vary. Timeline event data may be included in a generated temporal snapshot that represents the time-range. In yet another example, a temporal snapshot may present social graph data in a clustered representation of evolution for a social media identifier, link, topic, contributor, etc. A temporal snapshot may illustrate clustered data of an exemplary social graph, where a user may be able to see how social media identifiers/topics/links/contributors evolve over time. Furthermore, temporal snapshots may be able to be explored, where users may be able to navigate/toggle between past and present versions of temporal snapshots (and/or past/present representations of a social graph). In some examples, predictive temporal snapshots may be generated that provide a predictive view of a social media identifier, link, topic, contributor, etc. An exemplary social graph (or multiple temporal versions of social graphs) may be utilized to generate a predictive temporal snapshot.

FIG. 10 is a processing device view 1000 of exemplary temporal snapshot with which aspects of the present disclosure may be practiced. Processing device view 1000 provides another example of links that a user may select to pivot to different temporal snapshots and/or content directly related to a selected link. Processing device view 1000 may be a processing device view from a client device such as processing device 402 as described in FIG. 4.

Processing device view 1000 displays an exemplary temporal snapshot generated for a social media identifier of #hillary (e.g., relating to content for Hilary Clinton and her campaign for President of the United States). Content included in the generated temporal snapshot, displayed in processing device view 1000, comprises a link 1002 to an article entitled "90s Scandals Threaten to Erode Hillary Clinton's Strength with women." Link 1002 is a link to article content. Selection of link 1002 may pivot display of the temporal snapshot directly to the linked article. In the example shown in processing device view 900, the article of link 1002 is written by a contributor "Andrea Tantaros" who is a political analyst. A link 1004 to contributor Andrea Tantaros may also be displayed in the temporal snapshot. Clicking on link 1004 may pivot displayed content to a temporal snapshot that provides a contributor view for Andrea Tantaros, for example. A generated temporal snapshot displayed in processing device view 1000 may further comprise a link 1006 to a related social media identifier (e.g., #clinton) as well as links 1008 to related content/topics. However, the present disclosure is not limited by such an example. In addition to links and articles, other data may be incorporated into a temporal snapshot including but not limited to: video data, audio data, images, GIFs, social media data, text, etc.

FIGS. 11A and 11B are processing device views of output of social graph data with which aspects of the present disclosure may be practiced. As identified above, an application/service may be configured to enable access to a social graph and display data extracted from a social graph. Processing device view 1100 (shown in FIG. 11A) and processing device view 1120 (shown in FIG. 11B) display an exemplary application interface for accessing social graph data. However, one skilled in the art should recognize that examples described herein are not limited to what is shown in FIGS. 11A and 11B. Exemplary applications and application interfaces may be configured to explore a variety of aspects and relationships of an exemplary social graph. Moreover, other applications/services may be connected with the application interface to provide extensibility and integration with other products and services.

FIG. 11A illustrates processing device view 1100 providing a display of an exemplary application interface. As shown on the left side of processing device view 1100 menu options are displayed that are configured to enable a user to explore an exemplary social graph. Menu options may be utilized to identify related data such as entity data, related topics, related entities, related n-grams, etc. Related data may be identified based on the processing operations described previously for social graph generation. In one example, menu options may be dynamic pull-down menus. As an example, exploratory features (accessible through menu options) that may be utilized to explore a social graph may be anchored in time. For example, a user may want to explore social graph relationships (for a social media identifier) within a specific time period (e.g., 24 hours or 1 year).

In the example shown in processing device view 1100, a search term of "trump" is entered to generate a display of social graph data illustrating clustered relationships for the search term of "trump". An exemplary social graph display may be generated that illustrates relationships to the search term of "trump". A user may interact with the displayed social graph to explore related data for the searched term. Related data may comprise but is not limited to: related social media identifiers, topics, entities, n-grams, etc. An exemplary application interface may be configured to enable a user to utilize the menu options to manipulate display of the social graph. An exemplary application interface may also be configured to enable a user to select content directly in the representation of the social graph. For instance, a user may select a displayed node within the selected graph, which may result in update to the display of the social graph and/or related data presented for the social graph. Furthermore, processing device view 1100 comprises representations of related data (e.g., illustrated on the right side of processing device view 1100). Representations of related data may take any form and are not restricted to a specific position within an application interface. Representations of related data may further be generated and/or provided outside of the displayed application interface. In one example, one or more portions of related data may be aggregated to generate an exemplary temporal snapshot. Processing device view 1100 illustrates related data (for the search term of "trump") including related topics, links and users (e.g., contributors). Selection of a portion of related data may trigger update to a displayed social graph. In some examples, selection of related data, such as link to an article or webpage, may trigger access to resources external to the application interface.

FIG. 11B illustrates processing device view 1120 providing a display of an exemplary application interface. Processing device view 1120 illustrates an updated social graph as compared to the social graph displayed in processing device view 1100. In an example, the same application interface (described above in the description of FIG. 11A) is used for query processing. As an example, a user may enter another query or provide an updated search term for a re-query within an application interface. For instance, an updated search term may be "president" may be entered, where processing device view 1120 illustrates an updated social graph that reflects clustered relationships for search terms of "trump" (previous query shown in processing device view 1100) and a re-queried search term of "president". In alternative examples, menu options may be configured to enable a user to customize output of a social graph. For instance, an application interface may be configured to enable a user to: modify a displayed social graph, replace the displayed social graph with another social graph, and generate multiple social graphs, among other examples. As discussed previously, nodes within a displayed social graph are selectable. Display of the social graph may be updated with new connections and information coming from that new query when a user searches for a new topic, selects a node, selects a portion of related data, etc. In one example, a temporal snapshot may be generated based on modification of the social graph. Additionally, updated selection or querying may trigger update to the related data including related social media identifiers, topics, links, contributors, n-grams, etc.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   identifying a social media identifier, the social media identifier being at least one selected from a group consisting of: a hashtag extracted from at least one social networking service and a uniform resource identifier extracted from the at least one social networking service;
   accessing a social graph including clustered relationships developed based on analysis of social media data extracted from the at least one social networking service;
   generating, using the social graph, a temporal snapshot for the social media identifier, wherein the generated temporal snapshot comprises data extracted from the social graph including: the social media identifier, a related social media link corresponding with the social media identifier, a link to a related topic for the social media identifier, and a link to a contributor for context of the social media identifier;
   transmitting the temporal snapshot to an application of an entry point, the application accessed by a user device to display the temporal snapshot on the user device;
   displaying the temporal snapshot;
   storing the temporal snapshot on a component of a distributed network;
   subsequent to storing the temporal snapshot, recalling the stored temporal snapshot in response to receiving a request for the stored temporal snapshot; and
   transmitting the recalled temporal snapshot to the same, or a different, application of the same or a different entry point to display the recalled temporal snapshot on the same or a different user device accessing the same or different application.

2. The method according to claim 1, wherein the entry point is separate from the at least one social networking service.

3. The method according to claim 2, wherein the entry point is a search engine service.

4. The method according to claim 1, wherein the temporal snapshot comprises a summary of the related topic.

5. The method according to claim 1, wherein the temporal snapshot comprises links to two or more related topics for the social media identifier, where the two or more related topics are presented in a chronological order.

6. The method according to claim 1, wherein the generating of the temporal snapshot further comprises generating a temporal snapshot for a first geographic location and generated a second temporal snapshot for a second geographic location, and wherein the transmitting transmit the temporal snapshot and the second temporal snapshot for the entry point to distribute the temporal snapshot and the second temporal snapshot to respective geographical locations.

7. The method according to claim 1, further comprising accessing a knowledge graph from a resource separate from the social graph, and the generating of the temporal snapshot comprises incorporating the knowledge data extracted from the knowledge graph, wherein the knowledge data is related to the context of the social media identifier.

8. A method comprising:
   recalling a previously stored temporal snapshot from a component of a distributed network in response to receiving a request for the previously stored temporal snapshot;
   displaying the recalled temporal snapshot on a user device accessing an application of an entry point, wherein the displayed recalled temporal snapshot comprises:
      a social media identifier, the social media identifier being at least one selected from a group consisting of: a hashtag extracted from at least one social networking service and a uniform resource identifier extracted from the at least one social networking service,
      a related social media link corresponding with the social media identifier,
      a link to a related topic for the social media identifier, and
      a link to a contributor for context of the social media identifier;
   receiving a selection of a link in the displayed recalled temporal snapshot via the user device; and
   in response to receiving the selection, pivoting the display on the user device of the recalled temporal snapshot to a display of an updated temporal snapshot that features at least one of the related social media link, the link to the related topic, and the link to the contributor.

9. The method according to claim 8, wherein the pivoting further comprises generating a second temporal snapshot, and wherein the updated temporal snapshot is the second temporal snapshot.

10. The method according to claim 8, wherein the temporal snapshot comprises location data corresponding to the context of the social media identifier.

11. The method according to claim 8, wherein the temporal snapshot comprises knowledge data for the context of the social media identifier.

12. A system comprising:
   at least one processor; and
   a memory operatively connected with the at least one processor storing computer-executable instructions that, when executed by the at least one processor, causes the at least one processor to execute a method that comprises:
      recalling a previously stored temporal snapshot from a component of a distributed network in response to receiving a request for the previously stored temporal snapshot;
      displaying the recalled temporal snapshot on a user device accessing an application of an entry point, wherein the displayed recalled temporal snapshot comprises:

a social media identifier, the social media identifier being at least one selected from a group consisting of: a hashtag extracted from at least one social networking service and a uniform resource identifier extracted from the at least one social networking service, a related social media link corresponding with the social media identifier, a link to a related topic for the social media identifier, and a link to a contributor for context of the social media identifier, receiving a selection of a link in the temporal snapshot; and in response to receiving the selection, pivoting the display on the user device of the recalled temporal snapshot to a display of an updated temporal snapshot that features at least one of the related social media link, the link to the related topic, and the link to the contributor.

13. The system according to claim 12, wherein the pivoting further comprises generating a second temporal snapshot, and wherein the updated temporal snapshot is the second temporal snapshot.

14. The system according to claim 12, wherein the temporal snapshot comprises at least one of: location data corresponding to the context of the social media identifier and knowledge data for the context of the social media identifier.

* * * * *